US009650969B2

(12) United States Patent
Leblon

(10) Patent No.: US 9,650,969 B2
(45) Date of Patent: May 16, 2017

(54) MONITORING METHOD FOR MONITORING A FUEL INJECTOR OF AN INTERNAL COMBUSTION ENGINE OF A VEHICLE

(71) Applicants: CONTINENTAL AUTOMOTIVE FRANCE, Toulouse (FR); CONTINENTAL AUTOMOTIVE GmbH, Hannover (DE)

(72) Inventor: Michael Leblon, Bressols (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 264 days.

(21) Appl. No.: 14/548,555

(22) Filed: Nov. 20, 2014

(65) Prior Publication Data

US 2015/0142295 A1 May 21, 2015

(30) Foreign Application Priority Data

Nov. 21, 2013 (FR) ..................................... 13 61448

(51) Int. Cl.
*G06F 7/00* (2006.01)
*G06F 17/00* (2006.01)
(Continued)

(52) U.S. Cl.
CPC ........... *F02D 1/08* (2013.01); *F02D 41/2096* (2013.01); *F02D 41/221* (2013.01);
(Continued)

(58) Field of Classification Search
CPC ...... F02D 1/08; F02D 41/2096; F02D 41/247; F02D 41/221; F02D 2200/0602; F02D 2041/1433
See application file for complete search history.

(56) References Cited

U.S. PATENT DOCUMENTS 2,760,050 A 8/1956 Porsche
6,360,161 B1 3/2002 Francis et al.
(Continued)

FOREIGN PATENT DOCUMENTS

DE 10 2005 001498 A1 7/2006
DE 10 2011 005285 A1 9/2012
(Continued)

OTHER PUBLICATIONS

E. SchrUfer: "Signalverarbeitung", 1990, Carl Hanser Verlag, MUnchen, XP008170383, ISBN: 3-446-15944-4 pp. 72-109, Equation (3.4); p. 74.
(Continued)

*Primary Examiner* — Mahmoud Gimie
*Assistant Examiner* — David Hamaoui
(74) *Attorney, Agent, or Firm* — Young & Thompson

(57) ABSTRACT

Disclosed is a method for monitoring a fuel injector, the injector including a piezoelectric actuator controlling a valve unit to open or close the injector, the fuel injector including an actuator play. The method includes: measuring a plurality of compensation times of the actuator play during a simulation step preceding an injection for a given plurality of fuel pressures; calculating a parameter representing the current actuator play per the measured compensation times; comparing the parameter representing the calculated current actuator play with a predetermined reference parameter of the actuator play; and transmitting a warning message if the reference parameter is exceeded; the parameter representative of the current actuator play being calculated on the basis of a polynomial function of the measured compensation times. The polynomial order of the polynomial function corresponding to the number of measured compensation times of the actuator play for different fuel pressures.

20 Claims, 2 Drawing Sheets

(51) Int. Cl.

| | |
|---|---|
| ***F02D 1/08*** | (2006.01) |
| ***F02D 41/20*** | (2006.01) |
| ***F02D 41/22*** | (2006.01) |
| ***F02D 41/24*** | (2006.01) |
| *F02D 41/14* | (2006.01) |

(52) U.S. Cl.

CPC .... *F02D 41/247* (2013.01); *F02D 2041/1433* (2013.01); *F02D 2200/0602* (2013.01)

(56) References Cited

U.S. PATENT DOCUMENTS

| | | | | |
|---|---|---|---|---|
| 6,705,587 | B1 * | 3/2004 | Frank | F02M 47/027<br>137/315.03 |
| 6,725,147 | B2 | 4/2004 | Mollin | |
| 7,025,292 | B2 * | 4/2006 | Mohr | F02M 47/027<br>123/498 |
| 8,714,140 | B2 * | 5/2014 | Borchsenius | F02D 41/008<br>123/494 |
| 9,002,621 | B2 * | 4/2015 | Hauser | F02D 41/008<br>123/299 |
| 9,103,297 | B2 * | 8/2015 | Brandt | F02D 41/2096 |
| 9,127,632 | B2 * | 9/2015 | Hoffmann | F02D 41/2096 |
| 9,273,627 | B2 * | 3/2016 | Brandt | F02D 41/2096 |
| 2007/0204832 | A1 | 9/2007 | Jung et al. | |
| 2007/0250248 | A1 | 10/2007 | Frank et al. | |
| 2008/0028843 | A1 * | 2/2008 | Dietl | F02D 41/2096<br>73/114.45 |
| 2010/0199752 | A1 | 8/2010 | Lucido et al. | |
| 2011/0068189 | A1 * | 3/2011 | Hopp | F02D 41/2096<br>239/5 |
| 2011/0079199 | A1 | 4/2011 | Marzahn et al. | |
| 2011/0180044 | A1 * | 7/2011 | Fritsch | F02D 41/2096<br>123/478 |
| 2013/0066538 | A1 | 3/2013 | Brandt et al. | |
| 2013/0152902 | A1 | 6/2013 | Brandt et al. | |
| 2014/0060488 | A1 * | 3/2014 | Katzenberger | F02D 41/2096<br>123/456 |
| 2015/0369187 | A1 * | 12/2015 | Leblon | F02D 41/2096<br>239/5 |

FOREIGN PATENT DOCUMENTS

| | | | |
|---|---|---|---|
| DE | 10 2012 202344 | A1 | 8/2013 |
| WO | 2006/029931 | A1 | 3/2006 |
| WO | 2011/014445 | A1 | 11/2011 |
| WO | 2012/025428 | A1 | 3/2012 |

OTHER PUBLICATIONS

FR Search Report, dated Jul. 10, 2014, from corresponding FR application.

* cited by examiner

MONITORING METHOD FOR MONITORING A FUEL INJECTOR OF AN INTERNAL COMBUSTION ENGINE OF A VEHICLE

FIELD OF THE INVENTION

The present invention relates to the field of fuel injectors of an internal combustion engine of a vehicle and, in particular, monitoring a fuel injector in order to prevent malfunction.

BACKGROUND OF THE INVENTION

In a normal manner, with reference to FIG. 1, a fuel injector 1 comprises a piezoelectric actuator 2 which acts on a valve means in order to open or close the injector 1, allowing or stopping the injection of fuel C into a combustion chamber of the engine of the vehicle, respectively. In known manner, the vehicle comprises an on-board engine control unit (not illustrated) in order to activate the piezoelectric actuator 2 and to control the injection.

As is known, a piezoelectric actuator 2 is principally composed of a stack of ceramic members which define a predetermined length, which has the property of causing this length to be modified under the action of an electric field and conversely producing an electric field under the action of mechanical stress.

In a fuel injector 1, a piezoelectric actuator 2 is arranged between a stop of the injector and a valve means. In practice and in summarized manner, when an electric charge is applied to the piezoelectric actuator 2 using an electric voltage, the length thereof increases and opens the valve means of the injector 1 which thereby releases fuel C under pressure into the combustion chamber.

More specifically, still with reference to FIG. 1, in the case of an injection system comprising a common high-pressure injection rail, the valve means comprises a mushroom-like closure member 3 which is actuated directly by the piezoelectric actuator 2, and a needle 4 which is actuated by its contact with the high pressure in the injector, which is made possible by the movement of the mushroom-like closure member 3 toward the opening position thereof under the action of the piezoelectric actuator 2. The needle 4 of the injector 1 is suitable for being moved between a closure position and an opening position, referred to as an injection position. The injector is a "servo valve" injector comprising a valve means which is configured to place a volume of high-pressure fuel of the injection rail in connection with a low-pressure volume of the fuel tank. In other words, the piezoelectric actuator 2 allows the needle 4 to be caused to move in an indirect manner.

In practice, the piezoelectric actuator 2 moves the mushroom-like closure member 3 which allows, when it is opened, the high pressure which is from the injection rail and the low pressure of the return circuit of the fuel to the tank to be placed in connection, which modifies the force equilibrium at the terminals of the needle 4 of the injector 1, allowing an upward movement thereof. As a result of this upward movement, the needle 4 releases the openings of the nozzle 5 of the injector 1, which allows the injection of the fuel C into the combustion chamber to be brought about under the action of the high pressure of the rail.

In the rest state, that is to say, in a closure position of the valve means (with the mushroom-like closure member 3 and needle 4 closed), there is a play J between the piezoelectric actuator 2 and the valve means, more specifically between the piezoelectric actuator 2 and the mushroom-like closure member 3, in order to ensure the closure of that valve means and to prevent uncontrolled leaks of fuel toward the combustion chamber. This play J will be referred to in the remainder of the present text either using the complete term or using a shortened form "actuator play". This actuator play J is normally a few micrometres.

Over time, as a result of wear, the value of the actuator play J may develop which disrupts the operation of the injector 1. This is because the quantity of fuel C supplied by the injector 1 is no longer sufficient, which may bring about malfunctions of the engine of the vehicle.

An ideal solution would be to measure directly the effective value of the actuator play J. However, that requires, on the one hand, that the injector 1 be disassembled from the vehicle and, on the other hand, very specific tooling in order to allow the measurement of the actuator play J. In practice, therefore, the actuator play J is only rarely measured.

An ideal solution would be to integrate a distance sensor in order to measure the actuator play J. Such a solution cannot be implemented given the compact nature of the injector 1 and the order of magnitude of the actuator play J.

Furthermore, in order to allow an effective injection of fuel, it has been proposed to control the injector 1 in order to compensate for the development of the actuator play J, as set out by the patent application US2013066538A1. In the remainder of the present text, this method is referred to as the "compensation method".

According to the compensation method, the injector 1 is controlled in order to simulate a preceding injection step so as to determine a charge time $T_{MES}$ which is measured between the actuation time of the piezoelectric actuator 2 and the time from which the mushroom-like closure member 3 begins to move. This charge time $T_{MES}$ corresponds to the extension duration of the piezoelectric actuator 2 until it compensates for the actuator play J. In order to compensate for the development of the actuator play J, it is known to increase the injection energy in accordance with the predetermined charge time $T_{MES}$. In this manner, the quantity of fuel supplied by the injector 1 is correct in spite of the presence of the actuator play J.

However, such a compensation method does not allow an estimate of the value of the actuator play J in order to determine whether it is tending to deteriorate. Thus, in the event of malfunction of the vehicle, a mechanic may diagnose that the actuator play of the injectors 1 is too high and replace them. However, this diagnosis is not based on any objective piece of data and has limited reliability. In practice, it appears that a large number of injectors 1 are replaced needlessly, which increases the maintenance costs of a vehicle and constitutes a disadvantage. Furthermore, in the event of failure of an injector, it is necessary to immobilize the vehicle, which places the user thereof at a disadvantage.

There is a need to monitor in a reliable manner a fuel injector in order to anticipate a malfunction before it becomes effective and places the user at a disadvantage.

SUMMARY OF THE INVENTION

To this end, the invention relates to a monitoring method for monitoring a fuel injector of an internal combustion engine of a vehicle, the injector comprising a piezoelectric actuator which acts on a valve means in order to open or close the injector, allowing or stopping the injection of fuel into a combustion chamber of the engine, respectively, the fuel injector comprising an actuator play, the vehicle comprising an on-board engine control unit for carrying out the monitoring method, the monitoring method being characterized in that it comprises the following steps, during normal operation of the vehicle:

- a step of measuring a plurality of compensation times of the actuator play during a simulation step preceding an injection for a given plurality of fuel pressures;
- a step of calculating a parameter representative of the current actuator play in accordance with the measured compensation times;
- a step of comparing the parameter representative of the calculated current actuator play with a predetermined reference parameter of the actuator play; and
- a step of transmitting a warning message in the event of the reference parameter being exceeded;

the parameter representative of the current actuator play being calculated on the basis of a polynomial function of the measured compensation times; the polynomial order of the polynomial function corresponding to the number of measured compensation times of the actuator play for different fuel pressures.

In an advantageous manner, the invention allows the formation of a reliable indicator in respect of the state of a fuel injector on the basis of measurements of compensation times and whose first function is redirected. This is because a compensation time allows, firstly, the injection of fuel to be improved and, secondly, the conformity of the actuator play to be estimated.

As a result of the invention, a fault of a fuel injector owing to an excessively great actuator play is advantageously detected in a precise and rapid manner. In this manner, the fuel injector may be replaced before the vehicle effectively suffers a malfunction which results in the vehicle becoming immobilized, which is advantageous for the user of the vehicle. Furthermore, such a method allows the diagnostic operation carried out by a mechanic to be made easier, which reduces the maintenance costs.

The parameter representative of the current actuator play may be calculated in a direct and rapid manner, preferably in a continuous manner. The continuous monitoring of the vehicle allows its reliability to be improved, any fault being detected in a prompt manner.

Preferably, the polynomial order of the polynomial function is between 2 and 4, and is preferably 3. Such a polynomial function comprises a limited number of coefficients, which accelerates the calculation time.

According to a preferred aspect, the polynomial function being of the polynomial order n, the polynomial function is in the form:

$$\mathrm{PAR}(Jc)=a_{11}{*}T_{MES1}+a_{12}{*}T_{MES1}^{2}+\ldots+a_{1n}{*}T_{MES1}^{n}+a_{21}{*}T_{MES2}+a_{22}{*}T_{MES2}^{2}+\ldots+a_{2n}{*}T_{MES2}^{n}+\ldots+a_{n1}{*}T_{MESn}+a_{n2}{*}T_{MESn}^{2}+\ldots+a_{nn}{*}T_{MESn}^{n}$$

in which function the coefficients ($a_{11}, \ldots, a_{nn}$) are established.

Thus, the polynomial function does not comprise any correlation coefficients, or constant coefficients, which limits the number of coefficients to the polynomial order of the polynomial function. A simplified polynomial function allows use of a control unit having a low level of technicality, which reduces the cost thereof.

Preferably, the measured compensation times are obtained by a compensation method in which a compensation time corresponds to a measured duration of time for which a weak electric pulse corresponding to a predetermined test variation of the fuel pressure for a predetermined reference duration of electric actuation of the injector is applied to the piezoelectric actuator.

In a further preferable manner, the measured compensation times are obtained for fuel pressures between 200 bar and 2000 bar.

In a preferred manner, the parameter representative of the current actuator play is an electric voltage.

Preferably, the function which connects the parameter representative of the current actuator play to the measured compensation times is obtained by an estimation method on the basis of an experience base comprising a plurality of elements which are acquired over time for a given type of fuel injector, each element associating the measured compensation times with a parameter representative of a current actuator play which is measured in an effective manner.

Advantageously, the coefficients are established during the configuration of the vehicle then implemented in the control unit. A plurality of vehicles may thus benefit from a monitoring method by carrying out only a limited number of effective measurements of the parameter representative of the current actuator play.

BRIEF DESCRIPTION OF THE DRAWINGS

The invention will be better understood from a reading of the description below, which is given purely by way of example with reference to the appended drawings, in which.

It should be noted that the Figures set out the invention in a detailed manner in order to carry out the invention, the Figures naturally being able to be used to better define the invention, where applicable.

DETAILED DESCRIPTION OF THE INVENTION

Figure 1:
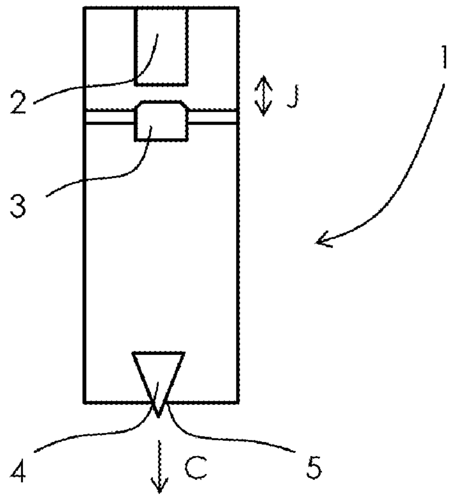
FIG. 1 schematically illustrates a fuel injector comprising a piezoelectric actuator.

The monitoring method according to the invention will be set out with reference to FIG. 1 which schematically illustrates a fuel injector 1 comprising a piezoelectric actuator 2 which acts on a valve means in order to open or close the injector 1. Still with reference to FIG. 1, the valve means comprises a mushroom-like closure member 3 which is actuated directly by the piezoelectric actuator 2, and a needle 4 which is actuated by its contact with a high pressure in an injection rail, which is made possible by the movement of the mushroom-like closure member 3 toward the opening position thereof under the action of the piezoelectric actuator 2. As previously indicated, the injector 1 comprises an actuator play J whose value is not known. In a preferred manner, the injector is a "servo valve" injector comprising a valve means which is configured to place a high-pressure volume of fuel of the injection rail in connection with a low-pressure volume of the fuel tank. In other words, the piezoelectric actuator 2 allows the needle 4 to be caused to move in an indirect manner.

The vehicle comprises in known manner an on-board engine control unit (ECU) which is not illustrated and which is used to carry out the monitoring method according to the invention which is described, by implementing a piece of software for carrying out the monitoring method. The electronic control unit of the piezoelectric actuator 2 is known to the person skilled in the art and will not be described in greater detail here. The control of the piezoelectric actuator 2 or the injector 1 may be carried out by means of a piece of control software which will be implemented in the engine control unit of the vehicle.

Figure 2:
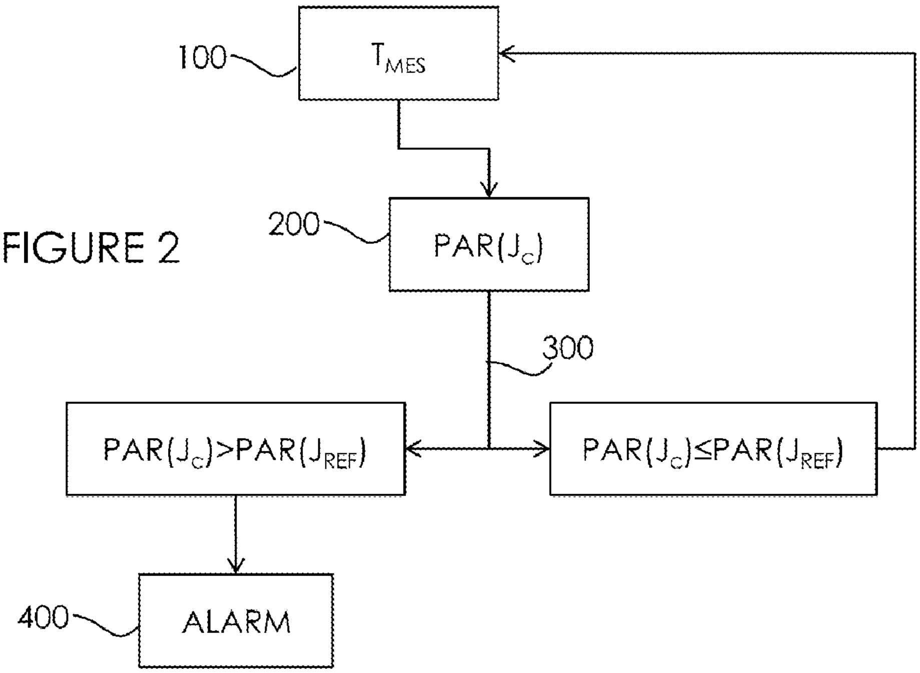
FIG. 2 is a flow chart of an embodiment of the method for monitoring a fuel injector according to the invention.

With reference to the flow chart of FIG. 2, the monitoring method comprises the following steps, during normal operation of the vehicle, with the engine running, the vehicle moving or in the stopped state:

- a step 100 of measuring a plurality of compensation times of the actuator play $T_{MES}$ during a simulation step preceding an injection for a given plurality of fuel pressures;
- a step 200 of calculating a parameter representative of the current actuator play $PAR(J_c)$ in accordance with the measured compensation times $T_{MES}$;
- a step 300 of comparing the parameter representative of the calculated current actuator play $PAR(J_c)$ with a predetermined reference parameter of the actuator play $PAR(J_{REF})$; and
- a step 400 of transmitting a warning message in the event of the reference parameter $PAR(J_{REF})$ being exceeded.

Each step of the method will now be set out in an individual manner.

The step 100 of measuring a plurality of compensation times of the actuator play will now be described:

During the first step 100, there are measured a plurality of compensation times $T_{MES}$ of the actuator play J. As indicated above, the charge time $T_{MES}$ corresponds to the extension duration of the piezoelectric actuator 2 until it compensates for the actuator play J.

The compensation time $T_{MES}$ depends on the fuel pressure in the injector 1. In this embodiment, three compensation times $T_{MES1}$, $T_{MES2}$, $T_{MES3}$ are measured during a simulation step preceding an injection for three given fuel pressures $P_1$, $P_2$, $P_3$ between 200 bar and 2000 bar.

Each compensation time $T_{MES}$ for a given pressure P is measured gradually by means of a compensation method as set out in the patent application US2013066538A1.

For the sake of clarity, a compensation method will be briefly set out below in order to establish a compensation time $T_{MES}$ for a given pressure.

The compensation time $T_{MES}$ corresponds to a measured duration of time for which a weak electric pulse corresponding to a predetermined test variation of the fuel pressure contained in a common injection rail of the engine, for a predetermined reference duration of electric actuation of the injector, is applied to the piezoelectric actuator 2.

The term "duration of electric actuation of the injector 1" is intended to be understood substantially to be the duration for which the electric charge is maintained at the terminals of the piezoelectric actuator 2. The pressure drop of the rail is very sensitive to the actuation of the valve means of an injector 1, and more specifically to the actuation of the mushroom-like closure member 3 of the injector 1. Such control of the state of the play J of the actuator may advantageously be brought about in a quasi permanent manner when the vehicle is in operation, with the exception of the phases of injection of fuel into the combustion chamber per se. This test may, for example, be carried out in an engine cycle after the top dead center of compression, during the non-loaded time of the engine.

In a preferred manner, the compensation method comprises the following steps:

- selecting a test variation of the fuel pressure contained in a common injection rail of the engine, corresponding to a predetermined duration of a time for which there is applied a predetermined electric current to the terminals of the piezoelectric actuator 2 giving a weak electric test charge at the terminals of the actuator 2, defining the predetermined reference duration of the electric actuation of the injector, so that a leak of fuel C is established on the basis of the common rail through the injector 1 toward the tank return without the needle of the injector opening,
- applying to the terminals of the piezoelectric actuator 2 a weak electric charge so that a leak of fuel C is established on the basis of the common rail through the injector 1 toward the tank return without the needle 4 of the injector 1 opening,
- maintaining that charge for the duration of the electric actuation in order to obtain a measurement of the pressure variation in the common injection rail,
- comparing the measurement of the pressure variation obtained with the selected test variation of the fuel pressure contained in a common injection rail,
- iterating the three preceding steps by modifying the time for which an electric pulse is applied to the piezoelectric actuator 2 until the measured pressure variation is equal to the test pressure variation, and
- measuring the duration of time for which an electric pulse, for which the measured pressure variation is equal to the test pressure variation, is applied to the piezoelectric actuator 2.

The measured application time corresponds to the compensation time $T_{MES}$ sought.

In a brief manner, the compensation method involves applying an electric pulse of weak intensity to the piezoelectric actuator 2, inducing the application of a weak voltage to the terminals of the piezoelectric actuator 2 bringing about a weak extension thereof, which brings about a small movement of the mushroom-like closure member 3 in the direction of the opening thereof in such a manner that a flow of fuel C passes through the injector 1 toward the return circuit of the fuel in the direction of the tank without the needle 4 of the injector 1 having time to begin to move in the direction of opening of the injection nozzle under the action of being placed in contact with the high pressure initiated by the mushroom-like closure member 3 opening.

Such a test advantageously allows, by comparing the duration of the measured electric charge in order to obtain the selected variation (test) of fuel pressure in the common rail for a predetermined reference duration of electric actuation of the injector 1, with the duration of the electric charge recorded in the engine control unit, for the same pressure test variation in the rail arising from a test pulse applied to the injector in the initial state or ex works state thereof, an evaluation of the derivative of the injector quasi-corresponding to the derivative of the real play between the piezoelectric actuator 2 and the valve means of the injector in relation to the initial play. This is because that measurement which is made without opening the injector 1, and therefore without moving the needle 4, causes only a small number of components to move (the mushroom-like closure member 3) and the derivative found may be completely or quasi-completely attributed to that play J of the actuator.

If the duration of the measured charge at the terminals of the piezoelectric actuator 2 is greater than the charge predicted or recorded, for a given test variation of pressure in the rail, that means that the play between the piezoelectric actuator 2 and the valve means has increased because more time is required in order to discharge the same quantity of fuel from the rail. Conversely, if the duration of the measured charge is smaller than the charge predicted or recorded, for a given test variation of pressure in the rail, that means that the play J between the piezoelectric actuator 2 and the valve means has decreased because less time is required in order to discharge the same quantity of fuel from the rail. This is because the time which the piezoelectric actuator 2 takes to take up the play during the application of a pulse of current having a predetermined duration to the terminals thereof is taken over the passage time of the fuel through the open mushroom-like closure injector 3; the quantity of fuel C passing through the injector 1 during a pulse of current, and consequently the fuel pressure in the common rail, is therefore a function directly of the play between the piezoelectric actuator 2 and the valve means of the injector 1.

By way of example, the test variation of the fuel pressure in the rail is, for example, in the order of 10 bar, and the electric charge applied to the piezoelectric actuator 2 is such that the voltage at the terminals thereof is in the order of 50 volt, for example, the predetermined duration itself being between 3 and 5 milliseconds, for example, 3 milliseconds.

The fuel pressure in the common rail is measured in known manner by means of a fuel pressure sensor which is installed on the common rail and which is necessary for the normal operation of the injection system, the engine control unit and, more generally, the engine.

The step 200 of calculating a parameter representative of the current actuator play $PAR(J_c)$ will now be described:

Still with reference to FIG. 2, the monitoring method according to the invention comprises a step of calculating a parameter representative of the current actuator play $PAR(J_c)$ in accordance with the compensation times $T_{MES1}$, $T_{MES2}$, $T_{MES3}$ obtained, in particular by carrying out a compensation method as set out above.

In a preferred manner, the parameter representative of the current actuator play $PAR(J_c)$ is calculated on the basis of a polynomial function which has the order n and whose input parameters correspond to the measured compensation times $T_{MES1}$, $T_{MES2}$, $T_{MES3}$ and whose coefficients are predetermined in accordance with the type of fuel injector. The result of a polynomial function is simple to obtain for a control unit, which allows calculations to be carried out frequently in order to monitor the fuel injector 1 continuously.

Preferably, the order of the polynomial function corresponds to the number of measurements of compensation times $T_{MES1}$, $T_{MES2}$, . . . , $T_{MESn}$. In a preferred manner, the polynomial function does not comprise interaction coefficients, each input parameter not being multiplied with another input parameter. Such a polynomial function has a limited number of predetermined coefficients $a_{11}$, . . . $a_{nn}$, which allows the calculation speed to be increased.

$$PAR(Jc)=a_{11}*T_{MES1}+a_{12}*T_{MES1}^2+ \dots +a_{1n}*T_{MES1}^n+ a_{21}*T_{MES2}+a_{22}*T_{MES2}^2+ \dots +a_{2n}*T_{MES2}^n+ \dots +a_{n1}*T_{MESn}+a_{n2}*T_{MESn}^2+ \dots +a_{nn}*T_{MESn}^n$$

According to a preferred aspect of the invention, the polynomial order n of the polynomial function is between 2 and 4, and is preferably 3.

In the present implementation example, the polynomial function which allows the parameter representative of the current actuator play $PAR(J_c)$ to be obtained is defined as follows:

$$PAR(Jc)=a_{11}*T_{MES1}+a_{12}*T_{MES1}^2+a_{13}*T_{MES1}^3+ a_{21}*T_{MES2}+a_{22}*T_{MES2}^2+a_{23}*T_{MES2}^3+ \dots +a_{31}*T_{MES3}+a_{32}*T_{MES3}^2+a_{33}*T_{MES3}^3$$

A polynomial function having the order 3 ensures a compromise between precision of establishing the parameter representative of the current actuator play $PAR(J_c)$ (high polynomial order) and speed of calculation (low polynomial order).

An example of obtaining the coefficients $a_{11}$, $a_{21}$, . . . $a_{nn}$ will now be described:

In this example, the coefficients $a_{n1}$ have dimensions V·s−1, the coefficients $a_{n2}$ have dimensions V·s−2, the coefficients $a_{n3}$ have dimensions V·s−3 and so on.

Figure 3:
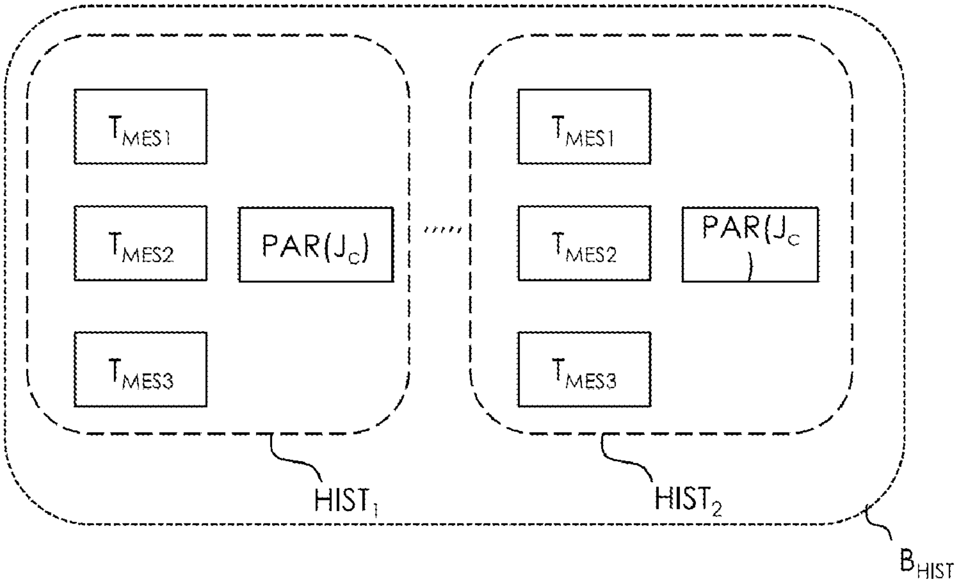
FIG. 3 is an example of elements of the experience base used in order to estimate the coefficients of the calculation module of a parameter representative of the current actuator play.

In this implementation example, with reference to FIG. 3, the coefficients $a_{11}$, . . . $a_{nn}$ of the polynomial function for a given type of fuel injector are obtained on the basis of an experience base $B_{HIST}$ comprising a plurality of elements $HIST_1$, $HIST_i$ which are acquired over time for a given type of fuel injector, each element $HIST_1$, $HIST_i$ associating the measured compensation times $T_{MES1}$, $T_{MES2}$, $T_{MES3}$ with a parameter representative of a current actuator play $PAR(J_c)$ which is measured in an effective manner. As set out above, the effective measurement of a parameter representative of a current actuator play $PAR(J_c)$ is complex to carry out because it requires that the vehicle be immobilized and that the fuel injector 1 be disassembled. Therefore, the experience base $B_{HIST}$ is produced during the development of a motor vehicle before it is marketed.

After the experience base $B_{HIST}$ of a given type of fuel injector has been obtained, the coefficients $a_{11}$, . . . $a_{nn}$ of the polynomial function for the given type of fuel injector are obtained by a mathematical estimation method.

In a preferred manner, the estimation method comprises a step of analysis by regression, for example, a Levenberg-Marquardt algorithm, an application of the method of the non-linear least squares, an interpolation of the algorithm of Gauss-Newton or an interpolation of the algorithm of the gradient.

Preferably, the estimation method further comprises a step of verification by calculating the adjusted correlation coefficient and a step of detection of the defective or deviating values, for example, by means of a comparison of the studentized residuals or the calculation of the Cook's distance.

The estimation method may further comprise a step of establishing the validity of the estimation function. In a preferred manner, in order to validate the estimation function, a step of analyzing the residues may be carried out (mean of the residues, homoscedasticity of the errors, lack of autocorrelation of the errors, compliance with the normal law of distribution of the residues, etc.).

The estimation method has been set out in order to establish the coefficients of a polynomial function, without interaction and without any constant term, in order to obtain a parameter representative of a current actuator play $PAR(J_c)$. However, it is self-evident that an estimation method may also be carried out in order to establish the coefficients with interactions and/or constant terms, or other types of mathematical function (exponential, linear (specific case of the polynomial function), power, etc.) which are estimated on the basis of the experience base $B_{HIST}$.

After obtaining the coefficients $a_{1n}$, $a_{2n}$, . . . $a_{nn}$ of the polynomial function, it is possible to establish in an easy and rapid manner a parameter representative of a current actuator play PAR(Jc) on the basis of measurements of compensation times $T_{MES1}$, $T_{MES2}$, $T_{MES3}$ obtained in a continuous manner by the compensation method.

Figure 4:
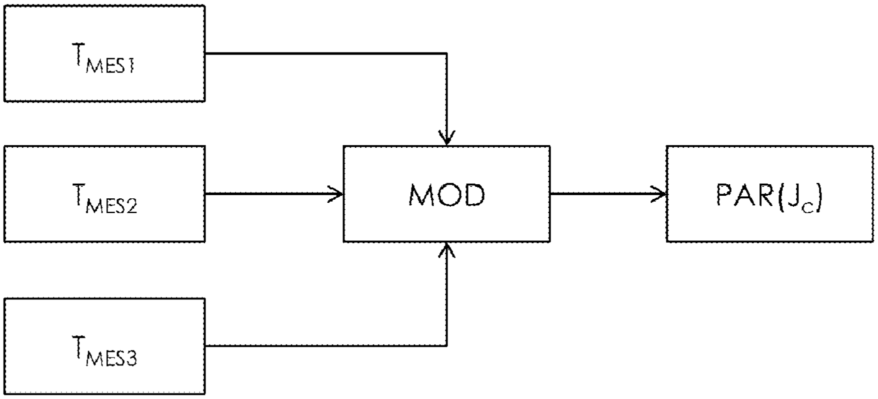
FIG. 4 is a schematic illustration of an embodiment for calculating the parameter representative of the current play on the basis of a calculation module and a plurality of measured compensation times.

In a preferred manner, with reference to FIG. 4, the on-board engine control unit comprises a calculation module MOD in which the polynomial function is implemented with its predetermined coefficients for the calculation of the parameter representative of a current actuator play $PAR(J_c)$.

The step 300 of comparing the parameter representative of the calculated current actuator play $PAR(J_c)$ will now be described:

According to the monitoring method according to the invention, with reference to FIG. 2, the method comprises a step 300 of comparing the parameter representative of the calculated current actuator play $PAR(J_c)$ with a parameter representative of a predetermined reference actuator play $PAR(J_{REF})$.

In a preferred manner, the parameter representative of a reference actuator play $PAR(J_{REF})$ is established for a given type of fuel injector on the basis of effective measurements carried out, for example, on an engine test bench. The parameter representative of a reference actuator play PAR $(J_{REF})$ is established so as to correspond to the tolerance threshold from which a given type of fuel injector is considered to be defective.

In this manner, it is simply necessary to compare the parameter representative of the calculated current actuator play $PAR(J_c)$ with the parameter representative of a predetermined reference actuator play $PAR(J_{REF})$ in order to establish whether the fuel injector 1, for which the current parameter has been calculated, is defective. Such a comparison is reliable and rapid to carry out.

The step 400 of transmitting a warning message in the event that the reference parameter $PAR(J_{REF})$ is exceeded will now be described:

According to the monitoring method according to the invention, the method comprises a step 400 of transmitting a warning message in the event that the reference parameter $PAR(J_{REF})$ is exceeded. In this manner, the user of the vehicle is directly alerted to a malfunction of the actuator play J while no effective breakdown has yet occurred to the vehicle. Such a warning is advantageous because it allows, on the one hand, anticipation of any effective breakdown and, on the other hand, communication to the mechanic of the nature of the malfunction. Thus, in an advantageous manner, a replacement for a fuel injector 1 is decided upon when a warning is transmitted and any needless replacement may be avoided.

In a preferred manner, the warning may be in the form of a display on the instrument panel of the vehicle or a recording in a control unit of the vehicle with regard to a subsequent maintenance step.

An implementation example will now be described:

In this implementation example of the invention, during the normal operation of the vehicle, the compensation times are measured (step 100):

| | | | |
|---|---|---|---|
| $P_1$ | 400 bar | $T_{MES1}$ | 84.8 μs |
| $P_2$ | 800 bar | $T_{MES2}$ | 86.4 μs |
| $P_3$ | 1200 bar | $T_{MES3}$ | 85.6 μs |

Subsequently, by carrying out the calculation module MOD of the control unit of the vehicle in which the polynomial function having the order 3 with the predetermined coefficients thereof is implemented, the parameter representative of the current actuator play $PAR(J_c)$ is calculated (step 200) in a rapid and precise manner. By way of example, the value of the parameter representative of the current actuator play $PAR(J_c)$ is 32.3 Volt.

During the tests which are carried out, it appears that the calculated value of the parameter representative of the current actuator play $PAR(J_c)$ is similar to the effective value thereof measured on a dedicated test bench, the error being less than 5%.

The value of the parameter representative of the current actuator play $PAR(J_c)$ (32.3 Volt) is compared (step 300) with the value of the reference parameter $PAR(J_{REF})$ which here is, by way of example, 30 V. Therefore, an alarm is transmitted (step 400) on the instrument panel in order to warn the driver of the vehicle. An alarm is also stored on the control unit, specifying the nature of the malfunction and the defective injector so as to allow the mechanic to carry out a reliable and precise diagnostic operation.

After the fuel injector 1 which is diagnosed as being defective has been replaced, a new parameter representative of the current actuator play $PAR(J_c)$ is calculated (step 200). By way of example, the value of the parameter representative of the current actuator play $PAR(J_c)$ is 20 volts and no alarm is transmitted.

The monitoring of the fuel injectors 1 is carried out in a continuous manner in order to detect in an early and precise manner any malfunction of a fuel injector 1 connected with the actuator play J. As a result of the invention, the motor vehicle is more reliable and has a lower maintenance cost.

The invention has been set out with three measurements of compensation times (polynomial function having the order 3) but naturally the invention applies in a similar manner for two measurements of compensation times (polynomial function having the order 2) or more than three measurements of compensation times (polynomial function having an order greater than 3).

The invention claimed is:

1. A monitoring method for monitoring a fuel injector of an internal combustion engine of a vehicle, the injector comprising a piezoelectric actuator which acts on a valve means in order to open or close the injector, allowing or stopping the injection of fuel into a combustion chamber of the engine, respectively, the fuel injector comprising an actuator play (J), the vehicle comprising an on-board engine control unit for carrying out the monitoring method, the monitoring method comprising the following steps, during normal operation of the vehicle:

a step of measuring a plurality of compensation times of the actuator play ($T_{MES1}$, $T_{MES2}$, $T_{MES3}$) during a simulation step preceding an injection for a given plurality of fuel pressures ($P_1$, $P_2$, $P_3$);

a step of calculating a parameter representative of the current actuator play ($PAR(J_c)$) in accordance with the measured compensation times ($T_{MES1}$, $T_{MES2}$, $T_{MES3}$);

a step of comparing the parameter representative of the calculated current actuator play ($PAR(J_c)$) with a predetermined reference parameter of the actuator play ($PAR(J_{REF})$); and a step of transmitting a warning message in the event of the reference parameter ($PAR(J_{REF})$) being exceeded;

the parameter representative of the current actuator play ($PAR(J_c)$) being calculated on the basis of a polynomial function of the measured compensation times (($T_{MES1}$, $T_{MES2}$, $T_{MES3}$); the polynomial order of the polynomial function corresponding to the number of measured compensation times of the actuator play (($T_{MES1}$, $T_{MES2}$, $T_{MES3}$) for different fuel pressures ($P_1$, $P_2$, $P_3$).

2. The monitoring method as claimed in claim 1, wherein the polynomial order of the polynomial function is between 2 and 4.

3. The monitoring method as claimed in claim 1, wherein, the polynomial function being of the polynomial order n, the polynomial function is in the form:

$$PAR(Jc)=a_{11}*T_{MES1}+a_{12}*T_{MES1}^{2}+\ldots+a_{1n}*T_{MES1}^{n}+a_{21}*T_{MES2}+a_{22}*T_{MES2}^{2}+\ldots+a_{2n}*T_{MES2}^{n}+\ldots+a_{n1}*T_{MESn}+a_{n2}*T_{MESn}^{2}+\ldots+a_{nn}*T_{MESn}^{n}$$

in which function the coefficients ($a_{11}$, . . . , $a_{nn}$) are established.

4. The monitoring method as claimed in claim 1, wherein the measured compensation times ($T_{MES1}$, $T_{MES2}$, $T_{MES3}$) are obtained by a compensation method in which a compensation time ($T_{MES1}$, $T_{MES2}$, $T_{MES3}$) corresponds to a measured duration of time for which a weak electric pulse corresponding to a predetermined test variation of the fuel pressure for a predetermined reference duration of electric actuation of the injector is applied to the piezoelectric actuator.

5. The monitoring method as claimed in claim 1, wherein the measured compensation times ($T_{MES1}$, $T_{MES2}$, $T_{MES3}$) are obtained for fuel pressures ($P_1$, $P_2$, $P_3$) between 200 bar and 2000 bar.

6. The monitoring method as claimed in claim 1, wherein the parameter representative of the current actuator play ($PAR(J_c)$) is an electric voltage.

7. The monitoring method as claimed in claim 1, wherein the function which connects the parameter representative of the current actuator play ($PAR(J_c)$) to the measured compensation times ($T_{MES1}$, $T_{MES2}$, $T_{MES3}$) is obtained by an estimation method on the basis of an experience base ($B_{HIST}$) comprising a plurality of elements ($HIST_1$, $HIST_i$) which are acquired over time for a given type of fuel injector, each element ($HIST_1$, $HIST_i$) associating the measured compensation times ($T_{MES1}$, $T_{MES2}$, $T_{MES3}$) with a parameter representative of a current actuator play ($PAR(J_c)$) which is measured in an effective manner.

8. The monitoring method as claimed in claim 2, wherein, the polynomial function being of the polynomial order n, the polynomial function is in the form:

$$PAR(Jc)=a_{11}*T_{MES1}+a_{12}*T_{MES1}^{2}+\ldots+a_{1n}*T_{MES1}^{n}+a_{21}*T_{MES2}+a_{22}*T_{MES2}^{2}+\ldots+a_{2n}*T_{MES2}^{n}+\ldots+a_{n1}*T_{MESn}+a_{n2}*T_{MESn}^{2}+\ldots+a_{nn}T_{MESn}^{n}$$

in which function the coefficients ($a_{11}$, . . . , $a_{nn}$) are established.

9. The monitoring method as claimed in claim 2, wherein the measured compensation times ($T_{MES1}$, $T_{MES2}$, $T_{MES3}$) are obtained by a compensation method in which a compensation time ($T_{MES1}$, $T_{MES2}$, $T_{MES3}$) corresponds to a measured duration of time for which a weak electric pulse corresponding to a predetermined test variation of the fuel pressure for a predetermined reference duration of electric actuation of the injector is applied to the piezoelectric actuator.

10. The monitoring method as claimed in claim 3, wherein the measured compensation times ($T_{MES1}$, $T_{MES2}$, $T_{MES3}$) are obtained by a compensation method in which a compensation time ($T_{MES1}$, $T_{MES2}$, $T_{MES3}$) corresponds to a measured duration of time for which a weak electric pulse corresponding to a predetermined test variation of the fuel pressure for a predetermined reference duration of electric actuation of the injector is applied to the piezoelectric actuator.

11. The monitoring method as claimed in claim 2, wherein the measured compensation times ($T_{MES1}$, $T_{MES2}$, $T_{MES3}$) are obtained for fuel pressures ($P_1$, $P_2$, $P_3$) between 200 bar and 2000 bar.

12. The monitoring method as claimed in claim 3, wherein the measured compensation times ($T_{MES1}$, $T_{MES2}$, $T_{MES3}$) are obtained for fuel pressures ($P_1$, $P_2$, $P_3$) between 200 bar and 2000 bar.

13. The monitoring method as claimed in claim 4, wherein the measured compensation times ($T_{MES1}$, $T_{MES2}$, $T_{MES3}$) are obtained for fuel pressures ($P_1$, $P_2$, $P_3$) between 200 bar and 2000 bar.

14. The monitoring method as claimed in claim 2, wherein the parameter representative of the current actuator play ($PAR(J_c)$) is an electric voltage.

15. The monitoring method as claimed in claim 3, wherein the parameter representative of the current actuator play ($PAR(J_c)$) is an electric voltage.

16. The monitoring method as claimed in claim 4, wherein the parameter representative of the current actuator play ($PAR(J_c)$) is an electric voltage.

17. The monitoring method as claimed in claim 5, wherein the parameter representative of the current actuator play ($PAR(J_c)$) is an electric voltage.

18. The monitoring method as claimed in claim 2, wherein the function which connects the parameter representative of the current actuator play ($PAR(J_c)$) to the measured compensation times ($T_{MES1}$, $T_{MES2}$, $T_{MES3}$) is obtained by an estimation method on the basis of an experience base $B(_{HIST})$ comprising a plurality of elements ($HIST_1$, $HIST_i$) which are acquired over time for a given type of fuel injector, each element ($HIST_1$, $HIST_i$) associating the measured compensation times ($T_{MES1}$, $T_{MES2}$, $T_{MES3}$) with a parameter representative of a current actuator play ($PAR(J_c)$) which is measured in an effective manner.

19. The monitoring method as claimed in claim 3, wherein the function which connects the parameter representative of the current actuator play ($PAR(J_c)$) to the measured compensation times ($T_{MES1}$, $T_{MES2}$, $T_{MES3}$) is obtained by an estimation method on the basis of an experience base ($B_{HIST}$) comprising a plurality of elements ($HIST_1$, $HIST_i$) which are acquired over time for a given type of fuel injector, each element ($HIST_1$, $HIST_i$) associating the measured compensation times ($T_{MES1}$, $T^{MES2}$, $T_{MES3}$) with a parameter representative of a current actuator play ($PAR(J_c)$) which is measured in an effective manner.

20. The monitoring method as claimed in claim 4, wherein the function which connects the parameter representative of the current actuator play ($PAR(J_c)$) to the measured compensation times ($T_{MES1}$, $T_{MES2}$, $T_{MES3}$) is obtained by an estimation method on the basis of an experience base ($B_{HIST}$) comprising a plurality of elements ($HIST_1$, $HIST_i$) which are acquired over time for a given type of fuel injector, each element ($HIST_1$, $HIST_i$) associating the measured compensation times ($T_{MES1}$, $T_{MES2}$, $T_{MES3}$) with a parameter representative of a current actuator play ($PAR(J_c)$) which is measured in an effective manner.

* * * * *